(12) United States Patent
Lee et al.

(10) Patent No.: US 8,945,765 B2
(45) Date of Patent: Feb. 3, 2015

(54) SECONDARY LITHIUM BATTERY ELECTROLYTE AND SECONDARY LITHIUM BATTERY INCLUDING THE SAME

(75) Inventors: Seok-soo Lee, Suwon-si (KR); Young-gyoon Ryu, Suwon-si (KR); Dong-joon Lee, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1154 days.

(21) Appl. No.: 12/559,846

(22) Filed: Sep. 15, 2009

(65) Prior Publication Data
US 2010/0143797 A1 Jun. 10, 2010

(30) Foreign Application Priority Data

Dec. 8, 2008 (KR) .................. 10-2008-0124290

(51) Int. Cl.
*H01M 10/0567* (2010.01)
*H01M 10/0568* (2010.01)
*H01M 10/0569* (2010.01)

(52) U.S. Cl.
CPC .. *H01M 10/0567* (2013.01); *H01M 2300/0025* (2013.01); *H01M 2220/30* (2013.01); *H01M 10/0568* (2013.01); *H01M 10/0569* (2013.01); *Y02E 60/122* (2013.01)
USPC ........... 429/203; 429/199; 429/341; 429/342; 429/343

(58) Field of Classification Search
CPC ......... H01M 10/052; H01M 10/0567–10/0569
USPC .................. 429/188, 199, 203, 324, 341–343
See application file for complete search history.

(56) References Cited

U.S. PATENT DOCUMENTS

| 2004/0229128 A1 | 11/2004 | Noh |
| 2005/0026043 A1 | 2/2005 | Kang et al. |
| 2006/0035155 A1* | 2/2006 | Tamura et al. ................ 429/339 |

(Continued)

FOREIGN PATENT DOCUMENTS

| EP | 0 901 180 | 3/1999 |
| EP | 1 463 143 | 9/2004 |
| JP | 02-260368 | 10/1990 |

(Continued)

OTHER PUBLICATIONS

Machine translation for Ro et al., JP 2004-327444 A.*

(Continued)

*Primary Examiner* — Edu E Enin-Okut
(74) *Attorney, Agent, or Firm* — Lee & Morse, P.C.

(57) ABSTRACT

A secondary lithium battery electrolyte including a lithium salt, a nonaqueous organic solvent, and an electrolyte additive represented by Formula 1:

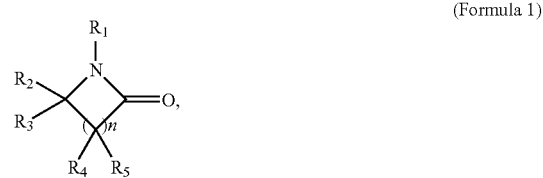

(Formula 1)

where n is an integer in the range of 1 to 4. A secondary lithium battery having excellent cycle and high temperature retention characteristics can be provided by using such secondary lithium battery electrolyte.

7 Claims, 4 Drawing Sheets

(56) References Cited

U.S. PATENT DOCUMENTS

| | | | |
|---|---|---|---|
| 2006/0172201 A1* | 8/2006 | Yasukawa et al. | ............ 429/329 |
| 2007/0099090 A1* | 5/2007 | Oh et al. | ........................ 429/339 |

FOREIGN PATENT DOCUMENTS

| | | | | |
|---|---|---|---|---|
| JP | 02-260374 | | 10/1990 | |
| JP | 10-064584 | | 3/1998 | |
| JP | 10-154529 | | 6/1998 | |
| JP | 2001057233 A * | 2/2001 | ............ | H01M 10/40 |
| JP | 2004-103433 | | 4/2004 | |
| JP | 2004327444 A * | 11/2004 | ............ | H01M 10/40 |
| JP | 2006-286382 | | 10/2006 | |
| WO | WO 99/19932 | | 4/1999 | |
| WO | WO 99/33132 | | 7/1999 | |
| WO | WO 99/65101 | | 12/1999 | |
| WO | WO 2006/078866 | | 7/2006 | |

OTHER PUBLICATIONS

"5-Methylpyrrolidin-2-one". ChemSpider. Royal Society of Chemistry. Accessed on: Feb. 24, 2014. >http://www.chemspider.com/Chemical-Structure.59445.html?rid=aad99367-e48f-4c1e-8d99-7719ab46539a<.*

Yang, C.R., et al., "Composition Analysis of the Passive Film on the Carbon Electrode of a Lithium-ion Battery with an EC-Based Electrolyte", *Journal of Power Sources*, 72 (1998), pp. 66-70.

* cited by examiner

SECONDARY LITHIUM BATTERY ELECTROLYTE AND SECONDARY LITHIUM BATTERY INCLUDING THE SAME

CROSS-REFERENCE TO RELATED APPLICATION

This application claims the benefit of Korean Patent Application No. 10-2008-0124290, filed Dec. 8, 2008, in the Korean Intellectual Property Office, the disclosure of which is incorporated herein by reference.

BACKGROUND

1. Field

Exemplary embodiments relate to a secondary lithium battery electrolyte and a secondary lithium battery including the secondary lithium battery electrolyte that can improve the cycle and high temperature retention characteristics of a battery using the secondary lithium battery electrolyte.

2. Description of the Related Art

As portable electronic devices, such as video cameras, cellular phones, notebook computers, and the like, become more lightweight and have higher performance, more research into batteries used as power supplies for such portable devices is being conducted. For example, chargeable lithium secondary batteries can be rapidly charged and have three times the energy density per unit weight than conventional lead storage batteries, nickel-cadmium batteries, nickel-hydrogen batteries, nickel-zinc batteries, and the like. Therefore, research and development of chargeable lithium secondary batteries is being actively conducted.

In general, a secondary lithium battery includes a cathode, an anode, a separator disposed between the cathode and the anode, and an electrolyte. The electrolyte is obtained by dissolving an appropriate amount of lithium salt in an organic solvent. The lithium salt may be, for example, $LiPF_6$, $LiBF_4$, $LiClO_4$, $LiN(C_2F_5SO_3)_2$, or the like, and provides a source of lithium ions in the secondary lithium battery, and thus a basic operation of the secondary lithium battery can be performed. In addition, if a carbonate-based, polar, nonaqueous solvent is used as the organic solvent, when the secondary lithium battery is initially charged, a carbonate-based electrolytic solution is partially oxidized on the cathode of the secondary lithium battery. Thus, a passivation layer is formed on a surface of the cathode by such irreversible reaction. The passivation layer is referred to as a solid electrolyte interface (SEI) membrane. The SEI membrane prevents the electrolytic solution from being oxidized any more, and allows the secondary lithium battery to retain stable charge/discharge capacity. In addition, since the SEI membrane functions as an ion tunnel so as to allow only lithium ions therethrough and to prevent a large excess of lithium ions from being eluted, a cathode structure can be prevented from collapsing.

However, when the SEI membrane is excessively thick, the electrolyte is depleted in the secondary lithium battery, and thus the performance of the secondary lithium battery may decrease. In addition, when the secondary lithium battery is initially charged, since a carbonate-based organic solvent is decomposed during the forming of the SEI membrane, a gas is generated in the secondary lithium battery, thereby increasing the thickness of the secondary lithium battery (J. Power Sources, 72 (1998), 66-70). Also, after charging the secondary lithium battery, when the secondary lithium battery is stored at a high temperature, the performance and stability of the secondary lithium battery may decrease.

In general, the capacity of an active material of an anode and a cathode can be increased in order to obtain the high capacity and high energy-density of a secondary lithium battery. Alternatively, a charging voltage of a secondary lithium battery can be set to be relatively high in order to extract a larger amount of capacity from the active material. Among such methods, when a charging voltage is set to be relatively high, the charging voltage is generally set to be equal to or greater than 4.3 V. However, at such a high voltage, the stability of a cathode active material may decrease, and a portion of an electrolyte may be oxidized, thereby forming a thick SEI membrane. Thus, the cycle characteristic of the secondary lithium battery may deteriorate.

For example, when the secondary lithium battery charged at a high voltage is stored at a high temperature, metal ions of the cathode active material are eluted to the electrolyte, and the eluted metal ions are deposited on the surface of the anode. Thus, the interfacial resistance of the secondary lithium battery increases, and accordingly the impedance of the secondary lithium battery increases, thereby reducing an open circuit voltage (OCV) of the secondary lithium battery. In this case, the discharge capacity of the secondary lithium battery may be remarkably decreased.

To overcome this problem, Japanese Patent Laid-open Publication No. 2006-286382 discloses that the cycle characteristic of a battery are improved by forming a lithium tetrafluoroborate ($LiBF_4$) and vinylene carbonate membrane on a surface of an electrode. However, according to this method in which the formation of an appropriate membrane is induced by adding a small amount of organic material as an additive, the characteristics of an SEI membrane formed on a surface of an electrode vary according to the type of solvent used in an electrolytic solution or the electrochemical characteristics of the additive. The formed SEI membrane remains unstable and the solution decomposition reaction is not prevented when the above organic material is used, thereby reducing the performance of the battery.

Therefore, there is a need for an additive that can form a thinner and stronger membrane compared to conventional additives, in order to reduce the reactivity of an electrolyte, so that a secondary lithium battery using an electrolyte including the additive can have improved cycle and high temperature retention characteristics.

SUMMARY

Aspects of the present invention provide a secondary lithium battery electrolyte that may prevent an electrolyte layer from being oxidized to be depleted and may prevent metal ions of an anode active material from being eluted in high temperature conditions.

Aspects of the present invention provide a secondary lithium battery that may have excellent cycle characteristic and high temperature retention characteristic by using the secondary lithium battery electrolyte.

Additional aspects will be set forth in part in the description which follows and, in part, will be apparent from the description, or may be learned by practice.

Aspects of the present invention provide a secondary lithium battery electrolyte including a lithium salt; a non-aqueous organic solvent; and an electrolyte additive represented by Formula 1:

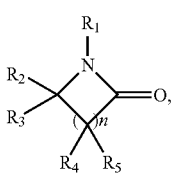

(Formula 1)

where R1 through R5 are each independently hydrogen, a halogen, a hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof; n is an integer in the range of 1 to 4; wherein, when n is equal to or greater than 2, $R_2$ through $R_5$ are not simultaneously hydrogen and the $R_4$ and $R_5$ of the additional carbons are independently selected.

Aspects of the present invention provide a secondary lithium battery that includes the secondary lithium battery electrolyte; an anode including an anode active material that can be reacted with lithium to reversibly form a lithium-containing compound; and a cathode including a cathode active material that may form a compound in which reversible intercalation and deintercalation of lithium ions may be performed.

Additional aspects and/or advantages will be set forth in part in the description which follows and, in part, will be obvious from the description, or may be learned by practice.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
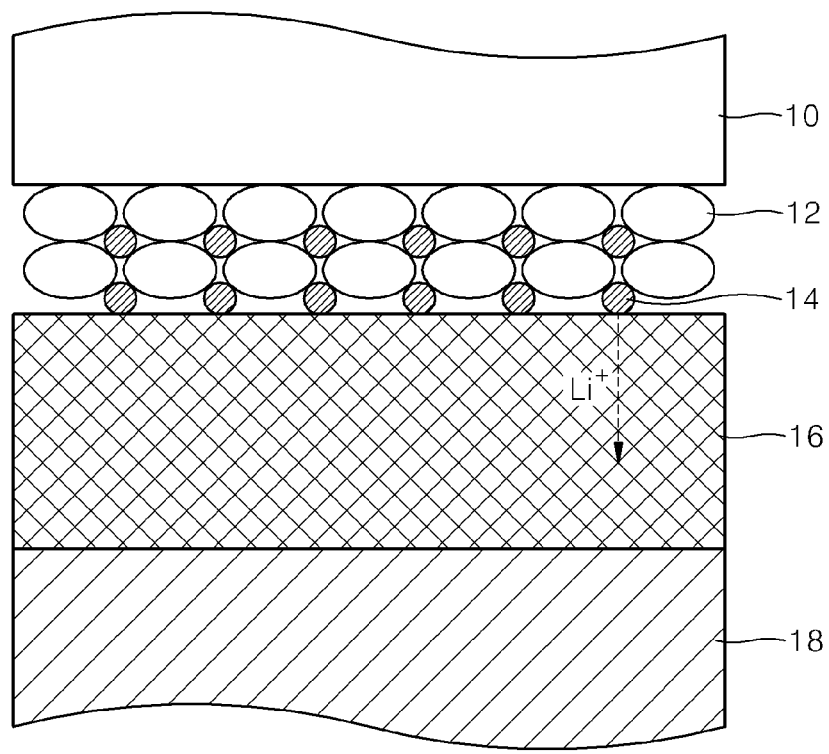
FIG. 1 illustrates a solid electrolyte interface (SEI) membrane formed on a surface of a cathode when a polar organic solvent is used as a conventional electrolytic solution.

Reference will now be made in detail to embodiments, examples of which are illustrated in the accompanying drawings, wherein like reference numerals refer to the like elements throughout. The embodiments are described below in order to explain aspects of the present invention by referring to the figures. It will be understood that when an element such as a layer, film, region, or substrate is referred to as being "formed on" or "disposed on" another element, it can be disposed directly on the other element, or intervening elements may also be present. In contrast, when an element is referred to as being "formed directly on" or "disposed directly on" another element, there are no intervening elements present.

Unless there is any specific contrary description in this specification, when the term "substitution" is used, it means that a material is substituted by a halogen, a hydroxyl group, an alkyl group, an alkoxyl group, or a combination thereof. Unless there is any specific contrary description in this specification, the term "alkoxy" is indicated by "—OR"; the term "ester" is indicated by "—COOR"; the term "carbonate" is indicated by "—OCO(OR)"; and the term "carbonyl" is indicated by "—COR". In addition, "R" is an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof. Unless there is any specific contrary description in this specification, the term "alkyl" is $C_1$-$C_{20}$ alkyl, for example, a $C_1$-$C_{12}$ alkyl; the term "aryl" is $C_6$-$C_{30}$ aryl, for example, a $C_6$-$C_{18}$ aryl; the term "cycloalkyl" is $C_3$-$C_{30}$ cycloalkyl, for example, a $C_3$-$C_{18}$ cycloalkyl; "alkenyl" is $C_2$-$C_{20}$ alkenyl, for example, a $C_2$-$C_{12}$ alkenyl; and the term "alkynyl" is $C_2$-$C_{20}$ alkynyl, for example, a $C_2$-$C_{12}$ alkynyl.

According to an embodiment, a secondary lithium battery electrolyte includes a lithium salt, a nonaqueous organic solvent, and an electrolyte additive represented by Formula 1:

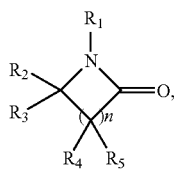

(Formula 1)

where R1 through R5 are each independently hydrogen, a halogen, a hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof, and n is an integer in the range of 1 to 4.

When n is equal to or greater than 2, $R_2$ through $R_5$ may not be simultaneously hydrogen. Thus, the electrolyte additive can be used to easily form a shape of a thin and strong solid electrolyte interface (SEI) membrane on a surface of a cathode of a secondary lithium battery. Further, even if an original electrolyte layer is depleted or in high temperature conditions, metal ions of a cathode active material are not eluted.

When n is equal to or greater than 2, each R4 and R5 of the additional carbon(s) is independently hydrogen, a halogen, a hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof.

FIG. 1 illustrates the case where an SEI membrane 16 is formed on a surface of a cathode 10 when a polar organic solvent is used to form a conventional electrolytic solution. Referring to FIG. 1, when the polar organic solvent, such as a carbonate solvent, is used to form an electrolyte 18, an electrolyte of a surface of the cathode 10, including a cathode active material 12, is oxidized to form the thick SEI membrane 16. Thus, since a portion of the electrolyte 18 is depleted, sufficient lithium ions 14 cannot be effectively transferred to the electrolyte 18 through the thick SEI membrane 16. In this case, the SEI membrane 16 prevents the lithium ions 14 from being intercalated and deintercalated, and thus the cycle characteristic of a secondary lithium battery using such a conventional electrolytic solution may deteriorate. In addition, when the secondary lithium battery is stored at a high temperature, because of the increased electrochemical energy and thermal energy of the secondary lithium battery, the SEI membrane 16 collapses as time elapses, thereby exposing a surface of the cathode 10 of the secondary lithium battery. When the SEI membrane 16 collapses, a regional difference in adhesion intensity between electrode plates of the secondary lithium battery occurs, and an inner portion of the secondary lithium battery is deformed, and an overvoltage is generated. Thus, the performance and stability of the secondary lithium battery may decrease.

Figure 2:
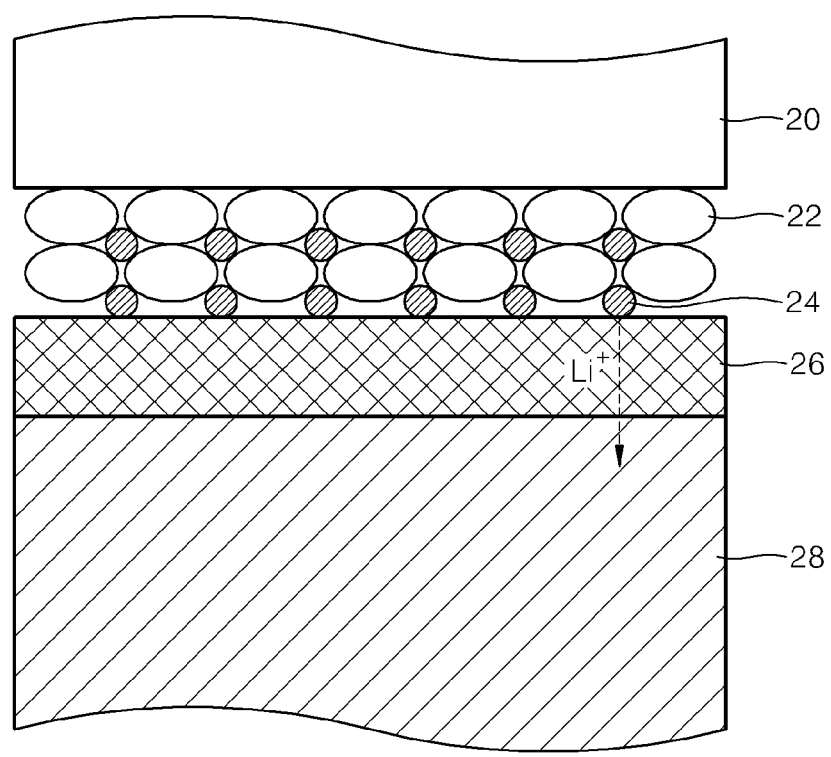
FIG. 2 illustrates an SEI membrane formed on a surface of a cathode when a secondary lithium battery electrolyte additive is added to an electrolyte, according to an exemplary embodiment.

FIG. 2 illustrates the case where a thin and strong SEI membrane 26 is formed on a surface of a cathode 20, including a cathode active material 22, when a secondary lithium battery electrolyte additive is added to an electrolyte 28, according to an embodiment. Referring to FIG. 2, the thin and strong SEI membrane 26 is formed by the electrolyte additive according to an embodiment, and thus lithium ions 24 of the cathode 20 can be effectively transferred to the electrolyte 28. Further, the formation of the thin and strong SEI membrane 26 prevents the electrolyte 28 from disappearing and/or prevents the lithium ions 24 from being eluted at a high temperature.

For example, $R_1$ through $R_3$ of the electrolyte additive represented by Formula 1 may be the same or different, and may be each independently hydrogen, a halogen, a hydroxyl group, an amine group, an alkoxyl group, an ester group, a carbonate group, a carbonyl group, an unsubstituted or substituted aryl group, an unsubstituted or substituted alkenyl group, an unsubstituted or substituted alkynyl group, or a combination thereof.

In addition, $R_4$ and $R_5$ may be the same or different, and may be each independently hydrogen, a halogen, a hydroxyl group, an amine group, an alkoxyl group, an unsubstituted or substituted alkyl group, an unsubstituted or substituted cycloalkyl group, or a combination thereof. Thus, the electrolyte additive represented by Formula 1 is easily decomposed even at a lower voltage than a polar solvent, thereby preventing a portion of the electrolyte layer from being oxidized.

According to another embodiment, a secondary lithium battery electrolyte may use an electrolyte additive represented by Formula 2 or Formula 3:

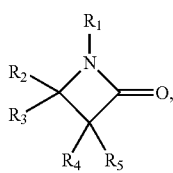

(Formula 2)

where R1 through R5 may be the same or different, and may be each independently hydrogen, a halogen, hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof.

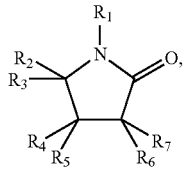

(Formula 3)

where R1 through R7 may be the same or different, and may be each independently hydrogen, a halogen, hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof. However, $R_2$ through $R_7$ may not be simultaneously hydrogen.

For example, the electrolyte additive of the secondary lithium battery electrolyte according to the present embodiment may be, azetidinone; a derivative of azetidinone, such as 2-azetidinone, N-methyl-2-azetidinone, 4-methyl-2-azetidinone, or the like; pyrrolidinone; a derivative of pyrrolidinone, such as 2-pyrrolidinone, N-methyl-2-pyrrolidinone, 5-methyl-2-pyrrolidinone, or the like; piperidinone; a derivative of piperidinone, such as 2-piperidinone, N-methyl-2-piperidinone, or the like; azepinone; a derivative of azepinone, such as 2-azepinone, N-methyl-2-azepinone, or the like; or a combination thereof.

When the unsubstituted or substituted 2-azetidinone is used, a secondary lithium battery having an excellent standard discharge capacity can be provided. When substituted 2-pyrrolidinone, such as 2-pyrrolidinone, 5-methyl-2-pyrrolidinone, or the like is used, the high temperature retention characteristic of the secondary lithium battery is excellent. Thus, the secondary lithium battery can have excellent charge/discharge capacity recovery ratio after storing the secondary lithium battery at a temperature in the range of about 60 to about 90° C.

The amount of the electrolyte additive may be in the range of about 0.1 to about 10 wt % based on the total weight of the secondary lithium battery electrolyte. In addition, the charge/discharge characteristic of the secondary lithium battery can be improved due to sufficient amounts of suitable materials for determining the characteristics of the secondary lithium battery.

The nonaqueous organic solvent allows ions related to an electrochemical reaction of the secondary lithium battery to be transmitted. The nonaqueous organic solvent is not limited to any particular material as long as the nonaqueous organic solvent allows for the transmission of ions related to an electrochemical reaction of the secondary lithium battery. For example, the nonaqueous organic solvent may be a carbonate-based, ester-based, ether-based, ketone-based, alcohol-based, or aprotic solvent, or a combination thereof. For example, the carbonate solvent may be, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may be dibutyl ether, tetraglyme, diglyme, dimethoxyethane, 2-methyltetrahydrofuran, tetrahydrofuran, or the like. The ketone-based solvent may be cyclohexanone, or the like. The alcohol-based solvent may be ethylalcohol, isopropyl alcohol, or the like. The aprotic solvent may be nitriles such as R—CN (where R may be a linear, branched, or cyclic hydrocarbon group having 2-20 carbon atoms, and may include a double bond direction ring or an ether bond), amides, such as dimethylformamide, dioxolanes, for example, 1,3-dioxolane, sulfolanes, or the like.

The nonaqueous organic solvents may be used alone or in a combination of one or more thereof. When the nonaqueous organic solvents are mixed, a mixing ratio may be controlled according to the performance of the secondary lithium battery that is subject to manufacture.

Cyclic carbonate and chain carbonate may be mixed to be used as the carbonate solvent. In this case, the cyclic carbonate and the chain carbonate are mixed in a volume ratio in the range of about 1:1 to about 1:9, thereby obtaining the excellent performance of the electrolytic solution.

The nonaqueous organic solvent may further include an aromatic hydrocarbon organic solvent in addition to the carbonate solvent. In this regard, the carbonate solvent and the aromatic hydrocarbon organic solvent may be mixed in a volume ratio in the range of about 1:1 to about 30:1.

The aromatic hydrocarbon organic solvent may be an aromatic hydrocarbon compound represented by Formula 4:

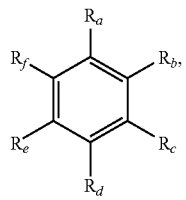

(Formula 4)

where Ra through Rf may be each independently hydrogen, a halogen, a C1-C10 alkyl group, a haloalkyl group, or a combination thereof.

For example, the aromatic hydrocarbon organic may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The nonaqueous organic electrolyte may further include a vinylene carbonate or ethylene carbonate compound represented by Formula 5 in order to improve lifetime of the secondary lithium battery:

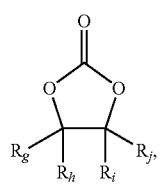

(Formula 5)

where Rg through Rj may each be independently hydrogen, a halogen, a cyano (CN) group, a nitro ($NO_2$) group, an alkyl group having 1-5 fluoride carbon atoms, or a combination thereof. However, Rg through Rj may not be simultaneously hydrogen.

The ethylene carbonate may be, for example, difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. When such additive for increasing lifetime is further used, the amount of the additive may be appropriately adjusted.

Lithium salt is dissolved in an organic solvent to provide a source of lithium ions in the secondary lithium battery, and thus a basic operation of the secondary lithium battery can be performed. In addition, the lithium salt is a material that facilitates the movement of the lithium ions between an anode and a cathode of the secondary lithium battery, and may be any material that is commonly used in a lithium battery. For example, the lithium salt may be $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are each a natural number), LiCl, LiI, lithium bisoxalate borate, or a combination thereof. The lithium salt may be a supporting electrolyte salt.

The concentration of the lithium salt may not be particularly limited, and may be in a range that is commonly used in the art. For example, the concentration of a lithium salt of an organic electrolytic solution including an organic solvent and a lithium salt may be in the range of about 0.1 to about 2.0 M. By using the lithium salt in a concentration in the range of about 0.1 to about 2.0 M, the concentration of an electrolyte can be appropriately adjusted, thereby improving the performance of the electrolyte. In addition, the viscosity of the electrolyte can be appropriately maintained, thereby improving the mobility of lithium ions.

Hereinafter, a secondary lithium battery including the secondary lithium battery electrolyte that has been described above will be described. According to an embodiment, a secondary lithium battery includes the secondary lithium battery electrolyte; an anode including an anode active material that can react with lithium to reversibly form a lithium-containing compound; and a cathode including a cathode active material that can form a compound in which reversible intercalation and deintercalation of lithium ions can be performed.

The secondary lithium battery including the secondary lithium battery electrolyte includes an SEI membrane that is formed on a portion of or an entire surface of the anode by decomposing the secondary lithium battery electrolyte additive represented by Formula 1. Thus, even if the secondary lithium battery is charged at a voltage higher than 4.3 V, an excellent capacity retention characteristic can be provided, thereby improving room temperature retention characteristics. In addition, the secondary lithium battery can have excellent capacity recovery and capacity retention characteristics at a high temperature.

Figure 3:
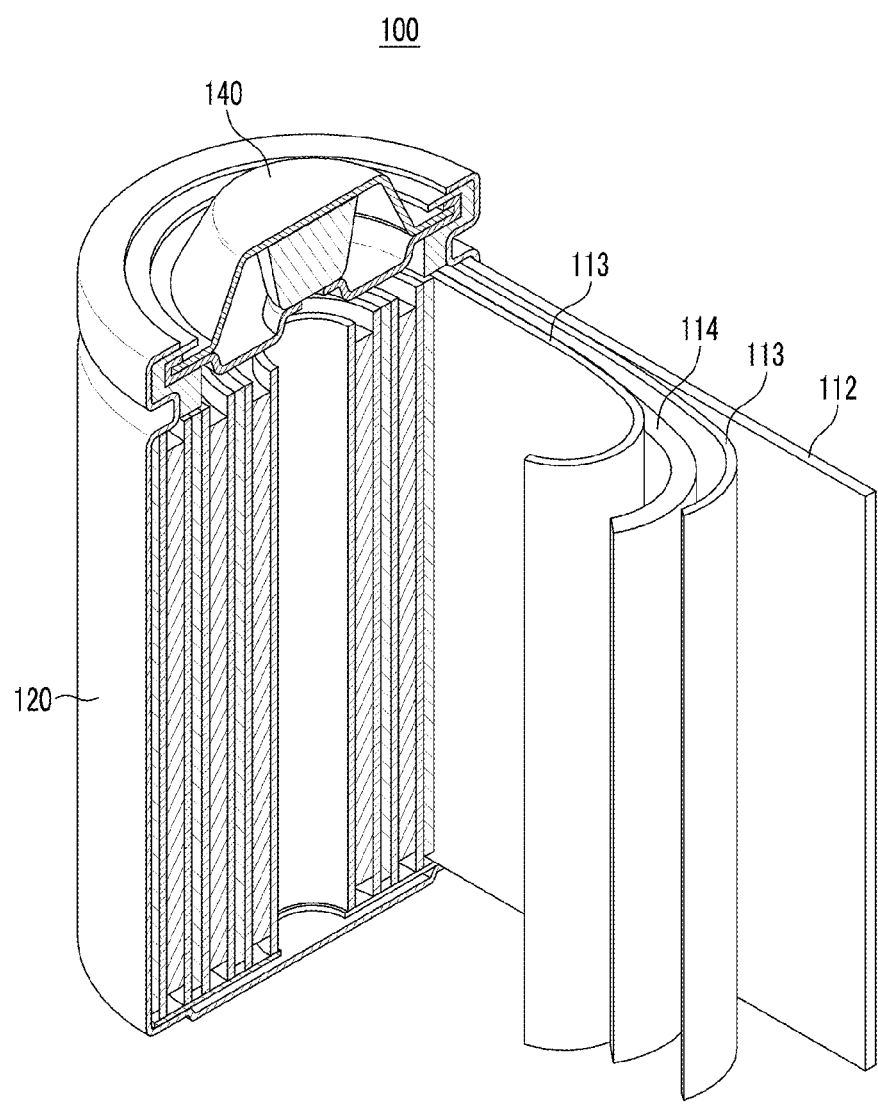
FIG. 3 is an exploded perspective view of a secondary lithium battery according to an exemplary embodiment.

FIG. 3 is an exploded perspective view of a secondary lithium battery 100 according to an embodiment. Referring to FIG. 3, the secondary lithium battery 100 according to the present embodiment has a cylindrical shape. However, the secondary lithium battery 100 is not limited thereto and may have a square or pouch shape.

Secondary lithium batteries can be classified into lithium ion batteries, lithium ion polymer batteries, and lithium polymer batteries according to types of a separator and an electrolyte that are used therein. Secondary lithium batteries can also be classified into cylindrical shape batteries, square shape batteries, and pouch shape batteries according to a shape thereof. And secondary lithium batteries can be further classified into bulk type batteries and thin film type batteries according to a size thereof. The shape of the secondary lithium battery is not particularly limited. Since the structure and method of manufacturing secondary lithium batteries are known to one of ordinary skill in the art, detailed descriptions thereof will not be provided here.

Referring to FIG. 3, the secondary lithium battery 100 has a cylindrical shape, and includes an anode 112, a cathode 114, a separator 113 disposed between the anode 112 and the cathode 114, an electrolyte (not shown) embedded in the anode 112, the cathode 114, and the separator 113, a battery container 120, and a sealing member 140 to seal the battery container 120. The secondary lithium battery 100 is configured by sequentially stacking the anode 112, the cathode 114, and the separator 113, and then putting the anode 112, the cathode 114, and the separator 113, which are wound in a spiral shape, into the battery container 120.

The anode 112 includes a current collector and an anode active material layer formed on the current collector, and the anode active material layer includes an anode active material. The anode active material may be a material commonly used in the art, and may not be particularly limited. For example, the anode active material may be lithium metal, a metallic material that can be alloyed with lithium, a transition metal oxide, a material doping and de-doping lithium, a material in which lithium ions can be reversibly intercalated and deintercalated, or the like.

The transition metal oxide may be, for example, vanadium oxide, lithium vanadium oxide, or the like. The material doping and de-doping lithium may be, for example, Si, $SiO_x$ (0<x<2), an Si—Y alloy (Y may be an alkali metal, an alkali earth metal, a Group 13 element, a Group 14 element, a transition metal, a rare earth element, or a combination thereof). In addition, at least one of these may be mixed with $SiO_2$, and then may be used. Further, Y may be Mg, Ca, Sr, Ba, Ra, Sc, Y, Ti, Zr, Hf, Rf, V, Nb, Ta, Db, Cr, Moi, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material in which lithium ions can be reversibly intercalated and deintercalated may be any carbide anode active material that is commonly used in a secondary lithium ion battery, and may be, for example, crystalline carbon, amorphous carbon, or a combination thereof. The crystalline carbon may be, for example, an amorphous, platy, flake, circular, or fibrinoplastin natural graphite or artificial graphite. The amorphous carbon may be, for example, soft carbon (i.e., low temperature calcination carbon), hard carbon, mesophase pitch carbide, calcination coke, or the like.

The anode active material layer may further include a binder, and may selectively further include a conducting material. The binder binds the anode active material particles to each other, and binds the anode active material to a current collector. For example, the binder may be polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, but is not limited thereto.

The conducting material provides an electrode with conductivity, and may not be limited to any particular material as long as the material is electronically conductive and does not change the chemical properties of a battery including the conducting material. For example, the conducting material may be a metal powder or metal fiber, such as natural graphite, artificial graphite, carbon black, acetylene black, ketjen black, carbon fiber, copper, nickel, aluminum, silver, or the like, or may be mixed with at least one of a plurality of conducting materials, such as polyphenylene derivatives.

The current collector may be, for example, a copper foil, a nickel foil, a stainless steel foil, a titanium foil, a nickel foam, a copper foam, a polymer member coated with a conductive metal, or a combination thereof.

The cathode 114 includes a current collector and a cathode active material layer formed on the current collector. The cathode active material may not be particularly limited, and may be a material commonly used in the art. For example, the cathode active material may be a compound through which lithium ions can be reversibly intercalated and deintercalated. More particularly, the cathode active material may be cobalt, manganese, or a combination thereof, or a mixed compound of lithium. For example, the cathode active material may be a compound represented by $Li_aA_{1-b}B_bD_2$ (where 0.90≤a≤1.8, and 0≤b≤0.5); $Li_aE_{1-b}B_bO_{2-c}D_c$ (where 0.90≤a≤1.8, 0≤b≤0.5, and 0≤c≤0.05); $LiE_{2-b}B_bO_{4-c}D_c$ (where 0≤b≤0.5, and 0≤c≤0.05); $Li_aNi_{1-b-c}Co_bB_cD_\alpha$ (where 0.90≤a≤1.8, 0≤b≤0.5, 0≤c≤0.05, and 0<α≤2); $Li_aNi_{1-b-c}Co_bB_cO_{2-\alpha}M_\alpha$ (where 0.90≤a≤1.8, 0≤b≤0.5, 0≤c≤0.05, and 0<α<2); $Li_aNi_{1-b-c}Co_bB_cO_{2-\alpha}M_2$ (where 0.90≤a≤1.8, 0≤b≤0.5, 0≤c≤0.05, and 0<α<2); $Li_aNi_{1-b-c}Mn_bB_cD_\alpha$ (where 0.90≤a≤1.8, 0≤b≤0.5, 0≤c≤0.05, and 0<α≤2); $Li_aNi_{1-b-c}Mn_bB_cO_{2-\alpha}M_\alpha$ (where 0.90≤a≤1.8, 0≤b≤0.5, 0≤c≤0.05, and 0<α<2); $Li_aNi_{1-b-c}Mn_bB_cO_{2-\alpha}M_2$ (where 0.90≤a≤1.8, 0≤b≤0.5, 0≤c≤0.05, and 0<α<2); $Li_aNi_bE_cG_dO_2$ (where 0.90≤a≤1.8, 0≤b≤0.9, 0≤c≤0.5, and 0.001≤d≤0.1); $Li_aNi_bCo_cMn_dG_eO_2$ (where 0.90≤a≤1.8, 0≤b≤0.9, 0≤c≤0.5, 0≤d≤0.5, and 0.001≤e≤0.1); $Li_aNiG_bO_2$ (where 0.90≤a≤1.8, and 0.001≤b≤0.1); $Li_aCoG_bO_2$ (where 0.90≤a≤1.8, and 0.001≤b≤0.1); $Li_aMnG_bO_2$ (where 0.90≤a≤1.8, and 0.001≤b≤0.1); $Li_aMn_2G_bO_4$ (where 0.90≤a≤1.8, and 0.001≤b≤0.1); $QO_2$; $QS_2$; $LiQS_2$; $V_2O_5$; $LiV_2O_5$; $LiRO_2$; $LiNiVO_4$; $Li_{(3-f)}J_2(PO_4)_3$ (0≤f≤2); $Li_{(3-f)}Fe_2(PO_4)_3$ (0≤f≤2); or $LiFePO_4$, where A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; M is F, S, P, or a combination thereof; G is Al, Cr, Mn, Fe, Mg, La, Ce, Sr, V, or a combination thereof; Q is Ti, Mo, Mn, or a combination thereof; R is Cr, V, Fe, Sc, Y, or a combination thereof; and J is V, Cr, Mn, Co, Ni, Cu, or a combination thereof.

Of course, a coating layer may be formed on the above-described cathode active material, or the above-described cathode active material may be mixed with a compound including a coating layer. The coating layer may include a coating element compound, such as an oxide, hydroxide, oxyhydroxide, oxycarbonate, or hydroxycarbonate of a coating element. The coating layer may be an amorphous or crystalline compound. The coating element included in the coating layer may be, for example, Mg, Al, Co, K, Na, Ca, Si, Ti, V, Sn, Ge, Ga, B, As, Zr, or a combination thereof. The coating layer may be formed using a method (e.g., a spray coating method, a digestive method, or the like) with the coating element, which is not particularly limited as long as the method does not adversely affect the properties of the cathode active material. Detailed descriptions of such methods will not be provided here.

The cathode active material layer may further include a binder and a conducting material. The binder binds cathode active material particles to each other, and binds the cathode active material to a current collector. For example, the binder may be polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, but is not limited thereto.

The conducting material provides an electrode with conductivity and is limited to any particular material as long as the material is electronically conductive and does not change the chemical properties of a battery including the conductive material. For example, the conducting material may be a metal powder or metal fiber, such as natural graphite, artificial graphite, carbon black, acetylene black, ketjen black, carbon fiber, copper, nickel, aluminum, silver, or the like, or may be mixed with at least one of a plurality of conducting materials, such as polyphenylene derivatives.

The current collector may be formed of Al, but is not limited thereto.

The anode 112 and the cathode 114 are fabricated by mixing an active material, a conductive material, and a binder in a solvent to prepare an active material composition, and then coating the active material composition on a current collector. Detailed descriptions of such methods will not be provided here. The solvent may be N-methylpyrrolidone, or the like, but is not limited thereto.

The separator 113 may be disposed between the anode 112 and the cathode 114. The material of the separator 113 may be determined according to the type of the secondary lithium battery. The separator 113 may be formed of polyethylene, polypropylene, or polyvinylidene fluoride, may have a plurality of layers formed of these, or may be a composite multilayer separator, such as a polyethylene/polypropylene two-layer separator, polyethylene/polypropylene/polyethylene three-layer separator, polypropylene/polyethylene/polypropylene three-layer separator, or the like, but is not limited thereto.

Hereinafter, the present invention will be described in more detail with reference to the following examples. However, the following examples are only for illustrative purposes and are not intended to be limiting.

Example 1

Preparation of Secondary Lithium Battery Electrolyte 0.5 wt % of 5-methyl-2-pyrrolidinone represented by Formula 6 below as an additive was added to a mixed organic solvent composed of 30 volume % of ethylene carbonate, 50 volume % of diethyl carbonate, and 20 volume % of ethylmethyl carbonate, and a lithium salt in the form of 1.3 M $LiPF_6$, thereby completing the preparation of a secondary lithium battery electrolyte.

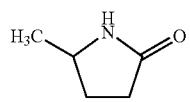

(Formula 6)

Example 2

Preparation of Secondary Lithium Battery Electrolyte

A secondary lithium battery electrolyte was prepared in the same manner as in Example 1 except that 1 wt % of 2-azetidinone represented by Formula 7 below as an additive was used instead of 0.5 wt % of 5-methyl-2-pyrrolidinone represented by Formula 6.

(Formula 7)

Example 3

Preparation of Secondary Lithium Battery Electrolyte

A secondary lithium battery electrolyte was prepared in the same manner as in Example 1 except that 9 wt % of 5-methyl-2-pyrrolidinone represented by Formula 6 as an additive was used instead of 0.5 wt % of 5-methyl-2-pyrrolidinone represented by Formula 6.

Example 4

Preparation of Secondary Lithium Battery Electrolyte

A secondary lithium battery electrolyte was prepared in the same manner as in Example 1 except that 3.5 wt % of 5-methyl-2-pyrrolidinone represented by Formula 6 as an additive was used instead of 0.5 wt % of 5-methyl-2-pyrrolidinone represented by Formula 6.

Example 5

Preparation of Secondary Lithium Battery Electrolyte

A secondary lithium battery electrolyte was prepared in the same manner as in Example 1 except that 1.5 wt % of 1-ethyl-4,5-dimethyl-2-pyrrolidinone represented by Formula 8 below as an additive was used instead of 0.5 wt % of 5-methyl-2-pyrrolidinone represented by Formula 6.

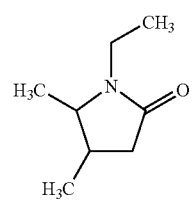

(Formula 8)

Example 6

Preparation of Secondary Lithium Battery Electrolyte

A secondary lithium battery electrolyte was prepared in the same manner as in Example 1 except that 1 wt % of 5-ethenyl-6-methyl-2-piperidinone represented by Formula 9 below as an additive was used instead of 0.5 wt % of 5-methyl-2-pyrrolidinone represented by Formula 6.

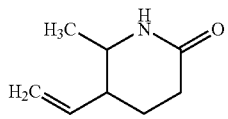

(Formula 9)

Comparative Example 1

Preparation of Secondary Lithium Battery Electrolyte

A secondary lithium battery electrolyte was prepared using a mixed organic solvent composed of 30 volume % of ethylene carbonate, 50 volume % of diethyl carbonate and 20 volume % of ethylmethyl carbonate, and a lithium salt in the form of 1.3 M $LiPF_6$. An additive was not used.

Comparative Example 2

Preparation of Secondary Lithium Battery Electrolyte

A secondary lithium battery electrolyte was prepared in the same manner as in Example 1 except that 1 wt % of 1-ethyl-2-pyrrolidinone represented by Formula 10 below as an additive was used instead of 0.5 wt % of 5-methyl-2-pyrrolidinone represented by Formula 6.

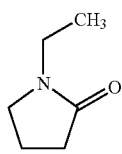

(Formula 10)

Examples 7 through 12

Manufacture of Secondary Lithium Batteries

A $Li_{1.25}NiCoMnO_2$ powder as a cathode active material, a binder in which 5 wt % of polyvinylidene fluoride (PVDF) was dissolved in N-methylpyrrolidone (NMP), and a conducting material (Super P) in a weight ratio of 94:3:3 were added to an agate mortar and mixed together to prepare a slurry. The slurry was cast on an aluminum foil having a thickness of 15 μm by using a doctor blade with a gap of 100 μm. The resultant was put into an oven at a temperature of 90° C. and first dried for about 2 hours to evaporate the NMP. Then, the resultant was secondarily dried for 2 hours to completely evaporate NMP. The resultant was roll-pressed to fabricate a cathode having a thickness of 60 μm.

A silicon oxide (SiO) as an anode active material and a binder in which polyamideimide is dissolved in a weight ratio of 90:10 were added to a mortar and mixed together to prepare a slurry. The slurry was cast on a copper foil having a thickness of 10 μm using a doctor blade with a gap 60 μm. The resultant was put into an oven at a temperature of 90° C. and first dried for about 2 hours to evaporate the NMP. Then, the resultant was roll-pressed to obtain a cathode having a thickness of 47 μm. The anode was put into an oven at a temperature of 200° C., and was cured for about 1 hour, thereby completing the fabrication of the anode.

A circular cathode having a diameter of 1.5 cm, a circular anode having a diameter of 1.6 cm, a polyethylene separator, and the secondary lithium battery electrolytes prepared in Examples 1 through 6 were used to manufacture 2032 size coin cells as Examples 7 through 12, respectively.

Comparative Examples 3 and 4

Manufacture of Secondary Lithium Batteries 2032 size coin cells were manufactured in the same manner as in Examples 7 through 12 except that the secondary lithium battery electrolytes prepared in Comparative Examples 1 and 2 were used as Comparative Examples 3 and 4, respectively.

Experimental Example 1

Charge/Discharge Characteristic Test of Secondary Lithium Batteries

Each of the coin cells manufactured in Examples 7 through 12 and Comparative Examples 3 and 4 was charged/discharged twice for formation of an SEI membrane. In a first formation, the coin cell was charged at a 0.05 C rate until a voltage of 4.53 V was reached. Then, the coin cell was discharged with a constant current at a 0.05 C rate until a voltage of 2.5 V with respect to the anode of the coin cell was reached. In a second formation, the coin cell was charged with a constant current at a 0.1 C rate until a voltage of 4.5 V with respect to the anode of the coin cell was reached, and then the coin cell was charged with a constant voltage of 4.5 V until a current of a 0.05 C rate with respect to the anode of the coin cell was reached. Then, the coin cell was discharged with a constant current at a 0.1 C rate until a voltage of 2.5 V was reached.

After the charge/discharge for formation, the coin cell was charged at 0.5 C rate in the above charging manner of the second formation, and then was discharged at 0.2 C rate until a voltage of 2.5 V with respect to the anode of the coin cell was reached. A charge/discharge condition at this time (a third cycle) is referred to as a standard charge/discharge condition, and discharge capacity at this time is referred to as standard capacity. Table 1 shows the discharge capacity and cycle retention efficiency of the coin cells manufactured in Comparative Examples 3 and 4, and Examples 7 and 8.

Figure 4:
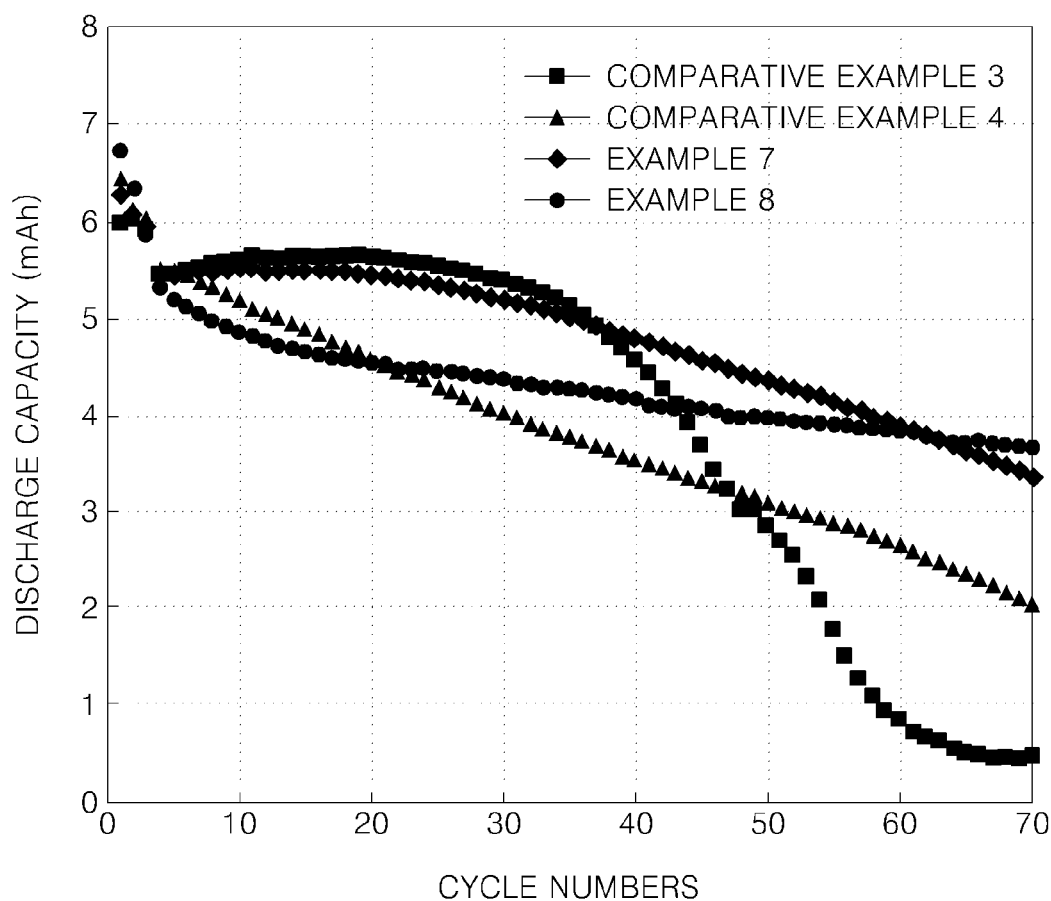
FIG. 4 is a graph showing discharge capacity characteristic with respect to a cycle in secondary lithium batteries of Examples 7 and 8, and Comparative Examples 3 and 4.

Then, the coin cell was charged at a 0.8 C rate in the above charging manner, and was discharged at a 0.2 C rate until a voltage of 2.5 V with respect to the anode of the coin cell was reached. A discharge capacity (discharge capacity of a fourth cycle) at this time was measured. The results are shown in Table 1. The coin cell was repeatedly charged and discharged, and then a cycle lifetime was estimated. The results are shown in FIG. 4. In addition, a discharge capacity of a $70^{th}$ cycle of the coin cell was measured, and then cycle retention efficiency was calculated. The results are shown in Table 1. The cycle retention efficiency (%) was obtained using Equation 1 below.

Cycle Retention Efficiency (%)=Discharge Capacity of 70th cycle/Discharge Capacity of 4th cycle  (Equation 1)

TABLE 1

| Division | Comparative Example 3 | Comparative Example 4 | Example 7 | Example 8 |
|---|---|---|---|---|
| $4^{th}$ Cycle Discharge Capacity (mAh) | 5.44 | 5.49 | 5.33 | 5.3 |
| $70^{th}$ Cycle Discharge Capacity (mAh) | 0.46 | 2.1 | 3.34 | 3.67 |

TABLE 1-continued

| Division | Comparative Example 3 | Comparative Example 4 | Example 7 | Example 8 |
|---|---|---|---|---|
| Cycle Retention Efficiency (%) | 8 | 37 | 61 | 69 |

As shown in Table 1 and referring to FIG. 4, the secondary lithium batteries manufactured in Examples 7 and 8 had much better cycle retention efficiency of the 70$^{th}$ cycle with respect to initial capacity than the secondary lithium batteries manufactured in Comparative Examples 3 and 4. For example, in the secondary lithium battery having no additive of Comparative Example 3, the discharge capacity began to rapidly drop at about the 30$^{th}$ cycle as shown in FIG. 4. However, the secondary lithium batteries of Examples 7 and 8 maintained excellent discharge capacity even up to the 70$^{th}$ cycle.

A battery on which formation charge/discharge was performed twice and standard charge/discharge was performed once was charged in the standard charge/discharge condition. Standard capacity means a discharge capacity at this 3$^{rd}$ cycle. Then, the battery was stored at a temperature of 90° C. for about 4 hours. Thus, a discharge capacity after storing the battery at high temperature was obtained (i.e., the discharge capacity at 4$^{th}$ cycle after having been stored at a high temperature), and high temperature retention efficiency was calculated from the discharge capacity. In addition, an open circuit voltage (OCV) before and after storing the battery at high temperature was measured.

Then, when the battery was charged and discharged at room temperature and in the standard charge/discharge condition, a recovery discharge capacity (discharge capacity at 5$^{th}$ cycle) was measured. From the recovery charge capacity, capacity retention ratio was calculated. The high temperature capacity retention ratio, the capacity recovery ratio, and the OCV difference between before and after storing the battery at a high temperature for Comparative Example 4 and Example 7 are shown in Table 2.

The high temperature capacity retention ratio (%) and the capacity recovery ratio (%) were obtained using Equations 2 and 3.

High Temperature Capacity Retention Ratio (%)=Discharge capacity after storing the battery at high temperature/Standard capacity    (Equation 2)

Capacity Recover Efficiency (%)=Recovery discharge capacity/Standard capacity    (Equation 3)

TABLE 2

| Division | Comparative Example 4 | Example 7 |
|---|---|---|
| Standard Capacity (mAh) | 5.8 | 6.1 |
| Discharge Capacity (mAh) after storing the battery at high temperature | 4.20 | 4.70 |
| High Temperature Capacity Retention Ratio (%) | 72.4 | 77 |
| Recovery Discharge Capacity (mAh) | 5.10 | 5.60 |
| Capacity Recovery Efficiency (%) | 86.4 | 92 |
| OCV (V) before storing the battery at high temperature | 4.324 | 4.355 |
| OCV (V) after storing the battery at high temperature | 4.044 | 4.104 |
| Δ V (V) | 0.280 | 0.251 |

As shown in Table 2, when the secondary lithium battery of Example 7 and the secondary lithium battery of Comparative Example 4 were stored at a temperature of 90° C. for about 4 hours, the secondary lithium battery of Example 7 showed a higher charge capacity after storing the battery at a high temperature than the secondary lithium battery of Comparative Example 4. Thus, it can be seen that a high temperature capacity retention ratio of the secondary lithium battery of Example 7 was improved compared to the secondary lithium battery of Comparative Example 4. In addition, when the secondary lithium battery of Example 7 and the secondary lithium battery of Comparative Example 4 were stored at a high temperature and then were restored to room temperature, a recovery discharge capacity of the secondary lithium battery of Example 7 was higher than that of the secondary lithium battery of Comparative Example 4. Thus, it can be seen that a capacity recovery efficiency of the secondary lithium battery of Example 7 was improved compared to the secondary lithium battery of Comparative Example 4. The secondary lithium battery of Example 7 had an improved OCV difference characteristic compared to the secondary lithium battery of Comparative Example 4.

As described above, according to the one or more of the above embodiments, a secondary lithium battery electrolyte forms an SEI membrane on a surface of a cathode, thereby preventing components included in the electrolyte from being dissolved and depleted. Thus, a secondary lithium battery including the secondary lithium battery electrolyte can have excellent capacity retention characteristic at high voltages and excellent room temperature retention characteristics. In addition, the secondary lithium battery can have excellent capacity recovery and capacity retention characteristics at high temperatures.

Although a few embodiments have been shown and described, it would be appreciated by those skilled in the art that changes may be made in this embodiment without departing from the principles and spirit thereof, the scope of which is defined in the claims and their equivalents.

What is claimed is:

1. A secondary lithium battery electrolyte, comprising:
a lithium salt;
a nonaqueous organic solvent; and
an electrolyte additive represented by Formula 1:

(Formula 1)

wherein:
R$_1$ is hydrogen;
R$_2$ and R$_3$ are each independently a hydroxyl group, an amine group, an alkoxyl group, an ester group, a carbonate group, a carbonyl group, an unsubstituted or substituted C$_2$-C$_{20}$ alkyl group, an unsubstituted or substituted aryl group, an unsubstituted or substituted cycloalkyl group, an unsubstituted or substituted alkenyl group, an unsubstituted or substituted alkynyl group, or a combination thereof;
R$_4$ through R$_5$ are each independently hydrogen, a halogen, a hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof;

n is an integer in the range of 1 to 4; and when n is equal to or greater than 2 the $R_4$ and $R_5$ of the additional carbons are independently selected.

2. The secondary lithium battery electrolyte of claim 1, wherein the electrolyte additive is represented by Formula 3 below:

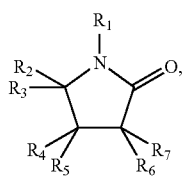

(Formula 3)

wherein:

$R_1$ is hydrogen;

$R_2$ and $R_3$ are each independently a hydroxyl group, an amine group, an alkoxyl group, an ester group, a carbonate group, a carbonyl group, an unsubstituted or substituted $C_2$-$C_{20}$ alkyl group, an unsubstituted or substituted aryl group, an unsubstituted or substituted cycloalkyl group, an unsubstituted or substituted alkenyl group, an unsubstituted or substituted alkynyl group, or a combination thereof;

$R_4$ through $R_7$ are each independently hydrogen, a halogen, a hydroxyl group, an amine group, an alkoxyl group, an ester group, a carbonate group, a carbonyl group, an unsubstituted or substituted alkyl group, an unsubstituted or substituted aryl group, an unsubstituted or substituted cycloalkyl group, an unsubstituted or substituted alkenyl group, an unsubstituted or substituted alkynyl group, or a combination thereof.

3. The secondary lithium battery electrolyte of claim 1, wherein the electrolyte additive includes azetidinone, a derivative of azetidinone, pyrrolidinone, a derivative of pyrrolidinone, piperidinone, a derivative of piperidinone, azepinone, a derivative of azepinone, or a combination thereof.

4. The secondary lithium battery electrolyte of claim 1, wherein the amount of the electrolyte additive is in the range of about 0.1 to about 10 wt % based on the total weight of the secondary lithium battery electrolyte.

5. The secondary lithium battery electrolyte of claim 1, wherein the nonaqueous organic solvent includes a carbonate-based solvent, an ester-based solvent, an ether-based solvent, a ketone-based solvent, an alcohol-based solvent, an aprotic solvent, or a combination thereof.

6. The secondary lithium battery electrolyte of claim 1, wherein the lithium salt is one of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_xF_{2y+1}SO_2)LiCl$, LiI, lithium bisoxalate borate, or a combination thereof, and x and y are each a natural number.

7. A secondary lithium battery, comprising:
an anode;
a cathode; and
the secondary lithium battery electrolyte of claim 1.

* * * * *